(12) United States Patent
Trask et al.

(10) Patent No.: US 10,339,440 B2
(45) Date of Patent: Jul. 2, 2019

(54) SYSTEMS AND METHODS FOR NEURAL LANGUAGE MODELING

(71) Applicant: Digital Reasoning Systems, Inc., Franklin, TN (US)

(72) Inventors: Andrew Trask, Nashville, TN (US); David Gilmore, Nashville, TN (US); Matthew Russell, Franklin, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 33 days.

(21) Appl. No.: 15/047,532

(22) Filed: Feb. 18, 2016

(65) Prior Publication Data

US 2016/0247061 A1 Aug. 25, 2016

Related U.S. Application Data

(60) Provisional application No. 62/128,915, filed on Mar. 5, 2015, provisional application No. 62/118,200, filed on Feb. 19, 2015.

(51) Int. Cl.
*G06N 3/02* (2006.01)
*G06N 3/04* (2006.01)
(Continued)

(52) U.S. Cl.
CPC ........... *G06N 3/04* (2013.01); *G06F 17/2715* (2013.01); *G06F 17/2785* (2013.01); *G06N 3/02* (2013.01); *G06N 3/0454* (2013.01); *G06N 3/08* (2013.01)

(58) Field of Classification Search
CPC ...................................................... G06N 3/02
(Continued)

(56) References Cited

U.S. PATENT DOCUMENTS 8,165,870 B2 4/2012 Acero et al.
8,219,406 B2 7/2012 Yu et al.
(Continued)

OTHER PUBLICATIONS

Stolcke et al ("Dialog Act Modeling for Conversational Speech" 1998).*
(Continued)

*Primary Examiner* — Lut Wong
(74) *Attorney, Agent, or Firm* — Meunier Carlin & Curfman LLC

(57) ABSTRACT

In some aspects, the present disclosure relates to neural language modeling. In one embodiment, a computer-implemented neural network includes a plurality of neural nodes, where each of the neural nodes has a plurality of input weights corresponding to a vector of real numbers. The neural network also includes an input neural node corresponding to a linguistic unit selected from an ordered list of a plurality of linguistic units, and an embedding layer with a plurality of embedding node partitions. Each embedding node partition includes one or more neural nodes. Each of the embedding node partitions corresponds to a position in the ordered list relative to a focus term, is configured to receive an input from an input node, and is configured to generate an output. The neural network also includes a classifier layer with a plurality of neural nodes, each configured to receive the embedding outputs from the embedding layer, and configured to generate an output corresponding to a probability that a particular linguistic unit is the focus term.

15 Claims, 6 Drawing Sheets

(51) Int. Cl.
  *G06N 3/08*  (2006.01)
  *G06F 17/27*  (2006.01)
(58) Field of Classification Search
  USPC .......................................................... 706/20
  See application file for complete search history.

(56) References Cited

U.S. PATENT DOCUMENTS

| | | | |
|---|---|---|---|
| 8,473,430 | B2 | 6/2013 | Yu et al. |
| 8,489,529 | B2 | 7/2013 | Deng et al. |
| 8,700,552 | B2 | 4/2014 | Yu et al. |
| 8,831,358 | B1 | 9/2014 | Song et al. |
| 8,918,352 | B2 | 12/2014 | Deng et al. |
| 9,037,464 | B1 | 5/2015 | Mikolov et al. |
| 2008/0133508 | A1 | 6/2008 | Jiang et al. |
| 2011/0258229 | A1 | 10/2011 | Ni et al. |
| 2012/0065976 | A1 | 3/2012 | Deng et al. |
| 2012/0072215 | A1 | 3/2012 | Yu et al. |
| 2012/0254086 | A1 | 10/2012 | Deng et al. |
| 2012/0303565 | A1 | 11/2012 | Deng et al. |
| 2012/0303932 | A1 | 11/2012 | Farabet et al. |
| 2013/0138436 | A1 | 5/2013 | Yu et al. |
| 2013/0138589 | A1 | 5/2013 | Yu et al. |
| 2013/0159229 | A1 | 6/2013 | Modha |
| 2013/0159231 | A1 | 6/2013 | Modha |
| 2013/0212052 | A1 | 8/2013 | Yu et al. |
| 2013/0232097 | A1 | 9/2013 | Shiv |
| 2013/0282634 | A1 | 10/2013 | Deng et al. |
| 2013/0343641 | A1 | 12/2013 | Mnih et al. |
| 2014/0067735 | A1 | 3/2014 | Yu et al. |
| 2014/0068740 | A1 | 3/2014 | Lecun et al. |
| 2014/0142929 | A1 | 5/2014 | Seide et al. |
| 2014/0177947 | A1 | 6/2014 | Krizhevsky et al. |
| 2014/0180986 | A1 | 6/2014 | Hinton et al. |
| 2014/0180989 | A1 | 6/2014 | Krizhevsky et al. |
| 2014/0229158 | A1 | 8/2014 | Zweig et al. |
| 2014/0249799 | A1 | 9/2014 | Yih et al. |
| 2014/0257803 | A1 | 9/2014 | Yu et al. |
| 2014/0257804 | A1 | 9/2014 | Li et al. |
| 2014/0257805 | A1 | 9/2014 | Huang et al. |
| 2014/0278424 | A1 | 9/2014 | Deng et al. |
| 2014/0366113 | A1 | 12/2014 | Lecun et al. |
| 2015/0379571 | A1* | 12/2015 | Grbovic ............. G06Q 30/0256 705/14.54 |

OTHER PUBLICATIONS

Balahur, A. et al., "Improving Sentiment Analysis in Twitter Using Multilingual Machine Translated Data," Proceedings of Recent Advances in Natural Language Processing, 2013 pp. 49-55, vol. 7, Bulgaria.

Balahur, A. et al., "Multilingual Sentiment Analysis using Machine Translation," Proceedings of the 3rd Workshop in Computational Approaches to Subjectivity and Sentiment Analysis. Association for Computational Linguistics, 2012 pp. 52-60, vol. 10, Republic of Korea.

Bengio, Y. et al., "A Neural Probabilistic Language Model," J. Mach. Learn. Res., 3:1137-1155, Mar. 2003. ISSN 1532-4435. URL http://dl.acm.org/citation.cfm?id=944919.944966., Canada.

Bird, S., "NLTK: The Natural Language Toolkit", Proceedings of the COLING/ACL 2006 Interactive Presentation Sessions, pp. 69-72, Sydney, Jul. 2006. @c2006 Association for Computational Linguistics.

Bodnari, A., "Joint Multilingual Learning Conference Resolution," Massachusetts Institute of Technology (MIT), 2014, pp. 1-120, vol. 120, Massachusetts.

Coates, A. et al., "Deep Learning With COTS HPC systems," In Proceedings of the 30th International Conference on Machine Learning, 2013, pp. 1337-1345, vol. 9, JMLR:W&CP, Georgia.

Collobert, R. et al., Natural Language Processing (almost) from Scratch, Journal of Machine Learning Research 2011, pp. 2493-2537, vol. 12, http://arxiv.org/1103.0398.

Creutz, M. et al., "Unsupervised Models for Morpheme Segmentation and Morphology Learning," ACM Transactions on Speech and Language Processing (TLSP), 2007, pp. 1-34, vol. 4, New York.

Goldberg, Y. et al., "Word2vec Explained: Deriving Mikolov et al.'s Negative-Sampling Word-Embedding Method," 2014, pp. 1-5, vol. 5, http://arXiv:1402.3722.

Harris, Z., "Distributional Structure," Word, 1954 pp. 146-162 vol. 10(23), http://dx.doi.org/10.1080/00437956.1954.11659520.

Hinton, G.E. et al., "Distributed Representations. Parallel Distributed Processing: Explorations in the Microstructure of Cognition," 1986, pp. 77-109, vol. 1(3).

Hinton, Geoffrey E., "To Recognize Shapes, First Learn to Generate Images," Progress in Brain Research, 2007, pp. 535-547, vol. 165. Canada.

Huang, E. et al., "Improving Word Representations via Global Context and Multiple Word Prototypes," In Proceedings of the 50th Annual Meeting of the Association for Computational Linguistics: Long Papers, 2012, pp. 873-882, vol. 1. Association for Computational Linguistics, California.

Katz, S., "Estimation of Probabilities From Sparse Data for the Language Model Component of a Speech Recognizer," IEEE Transactions on Acoustics, Speech and Signal Processing, 1987, pp. 400-401, vol. ASSP-35. New York.

Le, Q. et al., "Distributed Representations of Sentences and Documents," Proceedings of the 31st International Conference on Machine Learning, JMLR: W&CP, 2014, pp. 1-9, vol. 32, China.

Liang, P. et al., "Bringing Machine Learning and Compositional Semantics Together," Annual Review of Linguistics, 2015, pp. 355-376, vol. 1. California.

Luong, M. et al., "Better Word Representations With Recursive Neural Networks for Morphology," Proceedings of the Seventeenth Conference on Computational Natural Language Learning, 2013, pp. 104-113, California.

Maas, A. et al., "A Probabilistic Model for Semantic Word Vectors," NIPS Workshop on Deep Learning and Unsupervised Feature Learning, 2010, pp. 1-8(8). California.

Manning, C. et al., "An Introduction to Information Retrieval," Cambridge University Press, 2008, pp. 1-581. England. https://books.google.com/books/about/Introduction_to_Information_Retrieval.html?id=GNvtngEACAAJ&hl=en.

Manning, C. et al., "Foundations of Statistical Natural Language Processing," The MIT Press, 1999, pp. 1-504. Massachusetts. https://books.google.com/books/about/Foundations_of_Statistical_Natural_Langu.html?d=YiFDxbEX3SUC.

Mesnil, G. et al., "Ensemble of Generative and Discriminative Techniques for Sentiment Analysis of Movie Reviews," 2014, pp. 1-5, vol. 5. Montreal. eprint arXiv:1412.5335.

Mikolov, T. et al., "Distributed Representations of Words and Phrases and their Compositionality," Advances in Neural Information Processing Systems, 2013, pp. 3111-3119, vol. 26, Curran Associates, Inc.

Mikolov, T. et al., "Efficient Estimation of Word Representations in Vector Space," http://arxiv.org/pdf/1301.3781.pdf. pp. 1-12, California.

Mikolov, T. et al., "Exploiting Similarities Among Languages for Machine Translation," http://arxiv.org/pdf/1309.4168.pdf. pp. 1-10, California.

Mikolov, T. et al., "Linguistic regularities in Continuous Space Word Representations," Proceedings of NAACL-HLT, 2013, pp. 746-751.

Mnih, A. et al., "A Scalable Hierarchical Distributed Language Model," Advances in Neural Information Processing Systems, Curran Associates, 2009, pp. 1-8, Toronto.

Morin, F. et al., "Hierarchical probabilistic neural network language model," Proceeding of the International Workshop on Artificial Intelligence and Statistics, Citeseer, 2005, pp. 246-252.

Pennington, J. et al., "GloVe: Global Vectors for Word Representation," Proceedings of the 2014 Conference on Empirical Methods in Natural Language Processing (EMNLP), Association for Computational Linguistics, 2014, pp. 1532-1543, Qatar.

Qi, Y. et al., "Deep Learning for Character-based Information Extraction," Advances in Information Retrieval, Springer, 2014, pp. 1-9.

(56) References Cited

OTHER PUBLICATIONS

Santos, C. et al., "Learning Character-level Representations for Part-of-Speech Tagging," Proceedings of the 31st International Conference on Machine Learning (ICML-14), JMLR Workshop and Conference Proceedings, 2014, pp. 1818-1826, Brazil.

Sebastiani, F., "Machine Learning in Automated Text Categorization," ACM Comput. Surv., 2002, pp. 1-55, vol. 34. Italy.

Socher, R. et al., "Parsing Natural Scenes and Natural Language with Recursive Neural Networks," Proceedings of the 28th International Conference on Machine Learning, (ICML-11), 2011, pp. 129-136(8), California.

Trask, A. et al., "Modeling Order in Neural Word Embeddings at Scale," Proceedings of the 32nd International Conference on Machine Learning (ICML-15), JMLR Workshop and Conference Proceedings, 2015, pp. 1-10, Tennessee.

Turian, J. et al., "Word Representations: A Simple and General Method for Semi-Supervised Learning," Proceedings of the 48th Annual Meeting of the Association for Computational Linguistics, 2010, pp. 384-394, Sweden.

Unnikrishnan, K.P. et al., "Alopex: A Correlation-Based Learning Algorithm for Feed-Forward and Recurrent Neural Networks," Neural Computation 1994, pp. 1-39, vol. 6.

Waibel, A. et al., "Readings in Speech Recognition: Chapter Phoneme Recognition Using Time-Delay Neural Networks," Morgan Kaufmann Publishers Inc., 1990, pp. 393-404, California.

Wan, X., "Using Bilingual Knowledge and Ensemble Techniques for Unsupervised Chinese Sentiment Analysis," Proceedings of the Conference on Empirical Methods in Natural Language Processing, Association for Computational Linguistics, 2008, pp. 553-561.

Wang, S. et al., "Baselines and Bigrams: Simple, good Sentiment and Topic Classification," Proceedings of the 50th Annual Meeting of the Association for Computational Linguistics: Short Papers—vol. 2, 2012, pp. 90-94, Republic of Korea.

Zou, W. et al., "Bilingual Word Embeddings for Phrase-Based Machine Translation," Conference on Empirical Methods—in Natural Language Processing, 2013, pp. 1-6, California.

Socher, "Recursive Deep Learning for Natural Language Processing and Computer Vision," DSS. Stanford University. Aug. 2014; Retrieved from <http://nlp.stanford.edu/~socherr/thesis.pdf>: pp. 1-204.

International Search Report and Written Opinion in related International Application No. PCT/US2016/018536, dated Apr. 21, 2016.

International Preliminary Report on Patentability and Written Opinion, dated Aug. 31, 2017, in connection with International Application No. PCT/US2016/018536.

\* cited by examiner

SYSTEMS AND METHODS FOR NEURAL LANGUAGE MODELING

CROSS-REFERENCE TO RELATED APPLICATIONS

This application claims priority under 35 U.S.C. § 119(e) to U.S. Provisional Patent Application No. 62/118,200 entitled "Systems and Methods for Neural Language Modeling" filed Feb. 19, 2015, and U.S. Provisional Patent Application No. 62/128,915 entitled "Systems and Methods for Neural Language Modeling" filed Mar. 5, 2015, both of which are hereby incorporated by reference herein in their entireties as if fully set forth below.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. All references cited and discussed in this specification are incorporated herein by reference in their entireties and to the same extent as if each reference was individually incorporated by reference.

BACKGROUND

Natural Language Processing (NLP) systems seek to automate the extraction of useful information from sequences of symbols in human language. Some NLP systems may encounter difficulty due to the complexity and sparsity of information in natural language. Neural network language models (NNLMs) may overcome limitations of the performance of traditional systems. A NNLM may learn distributed representations for words, and may embed a vocabulary into a smaller dimensional linear space that models a probability function for word sequences, expressed in terms of these representations.

NNLMs may generate word embeddings by training a symbol prediction task over a moving local-context window. The ordered set of weights associated with each word becomes that word's dense vector embedding. The result is a vector space model that encodes semantic and syntactic relationships. A NNLM can predict a word given its surrounding context. These distributed representations encode shades of meaning across their dimensions, allowing for two words to have multiple, real-valued relationships encoded in a single representation. This feature flows from the distributional hypothesis: words that appear in similar contexts have similar meaning. Words that appear in similar contexts will experience similar training examples, training outcomes, and converge to similar weights.

Once calculated, word embeddings based on word analogies can allow vector operations between words that mirror their semantic and syntactic relationships. The analogy "king is to queen as man is to woman" can be encoded in vector space by the equation king-queen=man-woman.

Conventional NNLMs may not account for morphology and word shape. However, information about word structure in word representations can be valuable for part of speech analysis, word similarity, and information extraction. It is with respect to these and other considerations that aspects of the present disclosure are presented herein.

SUMMARY

Some aspects of the present disclosure relate to a computer-implemented neural network architecture that explicitly encodes order in a sequence of symbols and uses this architecture to embed both word-level and character-level representations. In some embodiments, a NNLM is provided that can take into account word morphology and shape. In some embodiments, an NNLM is provided that can be trained by multiple systems working in parallel. In some embodiments, an NNLM is provided that can be used to process analogy queries. In some embodiments, word embeddings learned via neural language models can share resources between multiple languages.

BRIEF DESCRIPTION OF THE FIGURES

Reference will now be made to the accompanying drawings, which are not necessarily drawn to scale.

DETAILED DESCRIPTION

Figure 2:
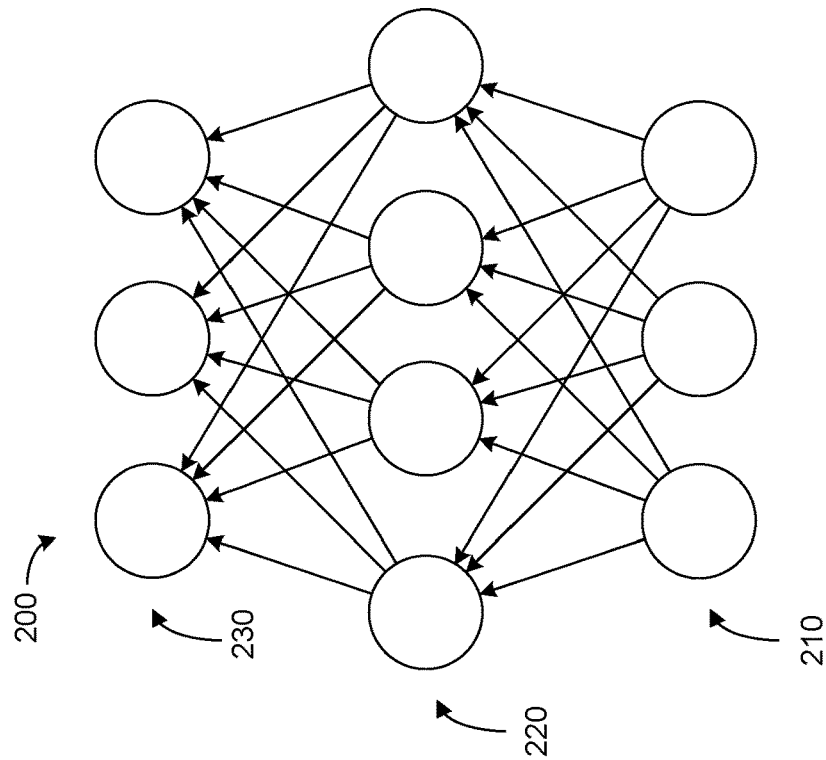
FIG. 2 depicts a neural network in accordance with one embodiment.

Although example embodiments of the present disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways.

It should also be noted that, as used in the specification and the appended claims, the singular forms "a," "an" and "the" include plural references unless the context clearly dictates otherwise. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the present disclosure are intended to be illustrative and not restrictive. Many suitable components that would perform the same or similar functions as the components described herein are intended to be embraced within the scope of the present disclosure. Such other components not described herein can include, but are not limited to, for example, similar components that are developed after development of the presently disclosed subject matter.

To facilitate an understanding of the principles and features of the present disclosure, various illustrative embodiments are explained below. In particular, the presently disclosed subject matter is described in the context of NNLM. The present disclosure, however, is not so limited, and can be applicable in other contexts. For example and not limitation, some embodiments of the present disclosure may improve other sequence recognition techniques and the like. These embodiments are contemplated within the scope of the present disclosure. Accordingly, when the present disclosure is described in the context of NNLM, it will be understood that other embodiments can take the place of those referred to.

A neural network can comprise a plurality of layers of neural nodes (i.e., "neurons"). In some embodiments, a neural network can comprise an input layer, a hidden layer, and an output layer. For ease of explanation, the basic functioning of a neural node in accordance with an embodiment will be explained below. However, as would be understood by a person having ordinary skill in the art, other types of neurons could be used.

The neural networks in accordance with aspects of the present disclosure may be computer-implemented. The plurality of layers and nodes may reside in executable program modules (e.g., program modules 714 in FIG. 7) or other software constructs, or in dedicated programmed hardware components. The layers and nodes, and other functional components described herein in accordance with various embodiments for performing aspects of neural language modeling may be stored in memory devices (e.g., memory 704 or mass storage 712) and executable by processors (e.g. processing unit 702) of one or more computers, such as the computer 700 shown in FIG. 7. The analysis, data processing and other functions associated with operating the layers and nodes and performing the various neural language modeling functions described herein, may be caused by the execution of instructions by one or more such processors. Training functions, such as model training processes as described herein, may be performed in conjunction with interactions of one or more users with one or more computers, such as the computer 700 of FIG. 7, and may be operated and configured such that trainable models can be improved based on the interaction of the users with training data and prior models, and can be implemented on various data in accordance with machine learning that may be supervised and/or autonomous.

Figure 1:
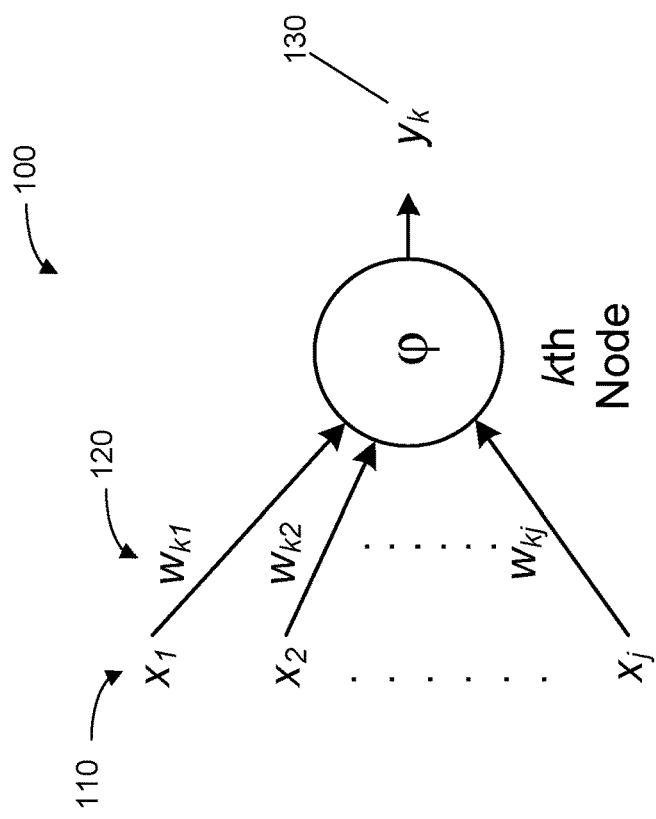
FIG. 1 depicts a neural node in accordance with one embodiment.

FIG. 1 depicts a neural node 100 in accordance with an embodiment. In some embodiments, each node 100 can have a plurality of inputs 110 each having a weight 120, and a single output 130. The output of a node is calculated as:

$$y_k = \phi\left(\sum_{j=0}^{m} w_{kj} x_j\right)$$

where the output y of the $k^{th}$ node is calculated as the sum of each input x of the node multiplied by a corresponding weight $w_{kj}$ for that input. The result of the summation is then transformed by a transfer function. In some embodiments, transfer function #can be a sigmoid function, represented by:

$$S(t) = \frac{1}{1 + e^{-t}}$$

In some embodiments, each input can accept a value between zero and one, although other values can be used. Collectively, the inputs can be represented by input vector x:

$$x = [x_0 x_1 \ldots x_n]$$

Each input also has a weight associated with it, with the collective set of input weights comprising the vector.

$$w_k = [w_0, w_1, w_2 \ldots w_m]$$

FIG. 2 depicts a generalized neural network in accordance with an embodiment. This network comprises an input layer 210 with three nodes, a hidden layer 220 with four nodes, and an output layer 230 with three nodes. The nodes in the input layer 210 output a value, but do not themselves calculate a value. In an embodiment, the output may be a number between zero and one. Each node in the hidden layer 220 receives outputs from each node of the input layer 210, and outputs the result of the equation $$y_k = \phi\left(\sum_{j=0}^{m} w_{kj} x_j\right)$$

set forth above. The output of the hidden layer 220 is then fed forward to the output layer 230. Each node in the output layer calculates its output as the result of the equation $$y_k = \phi\left(\sum_{j=0}^{m} w_{kj} x_j\right),$$

which corresponds to the output of the network. This depiction of a neural network is intended to assist with understanding neural networks and does not limit the disclosed technology. That is, a neural network may consist of hundreds, thousands, millions, or more nodes in each of the input, hidden, and output layers. Further, neural networks may have a single hidden layer (as depicted), or may have multiple hidden layers.

The weights for a layer of nodes can further be represented by the matrix:

$$w = [w_{0,0} w_{0,1} \ldots w_{0,j} w_{1,0} w_{1,1} \vdots \ddots \vdots w_{k,0} \ldots w_{k,j}]$$

thus, the output for the group of nodes can be calculated as:

$$y=\phi(w \times x)$$

Figure 3:
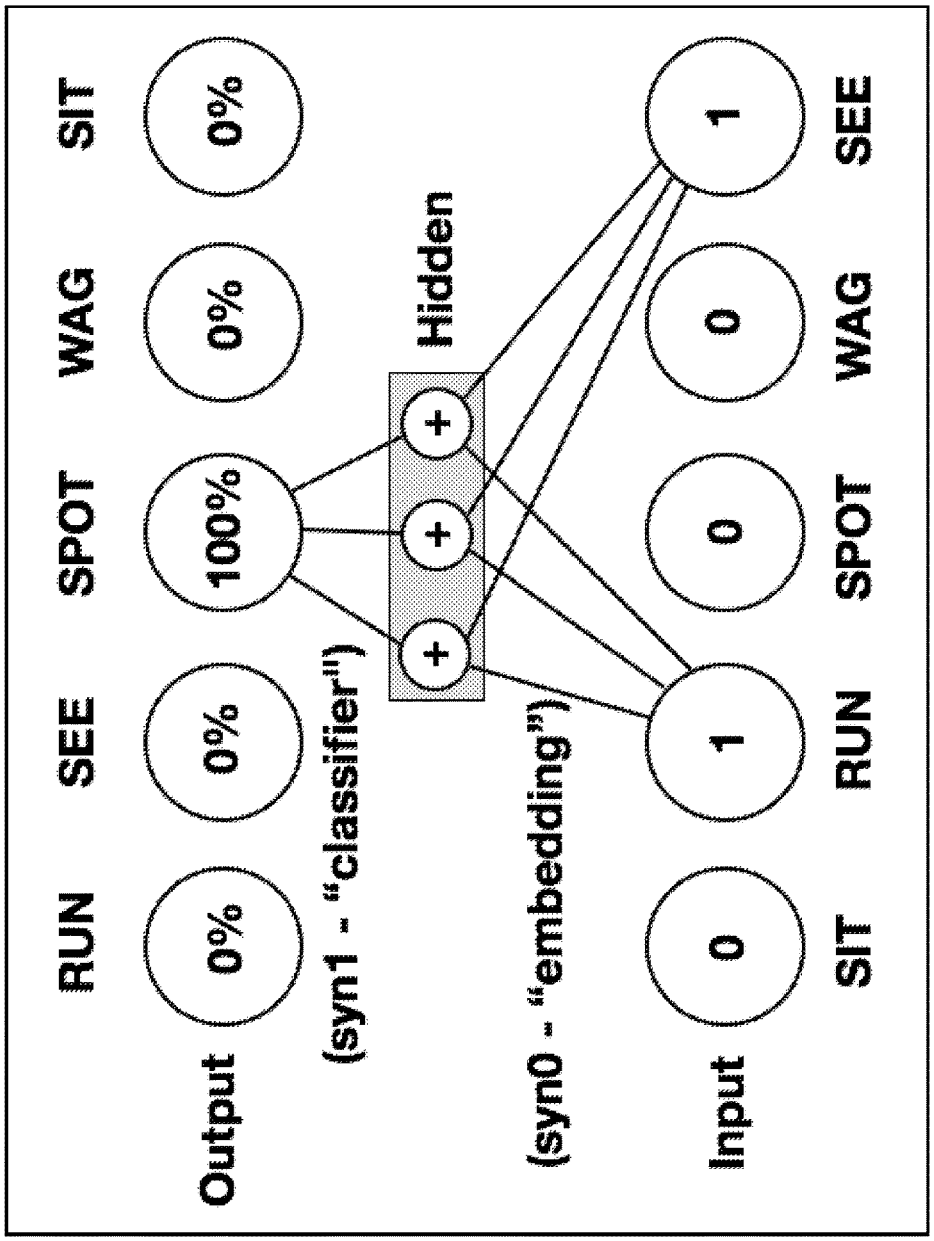
FIG. 3 depicts a neural network language model without partitioning, using a continuous bag of words architecture.

A neural network in accordance with some embodiments can be used for analyzing an ordered list of linguistic units. A linguistic unit as defined herein can refer to a phrase, word, letter, or other character or characters used in language. In some embodiments, the neural network is configured to take the ordered list of linguistic units, with a linguistic unit omitted, and predict the omitted linguistic unit. This omitted linguistic unit is referred to as a "focus term." For example, FIG. 3 depicts a neural network analyzing the phrase "SEE SPOT RUN." The input nodes for "SEE" and "RUN" are activated, to predict the focus term "SPOT." The neural network then appropriately predicts that the missing word is "SPOT" by returning a 100% at the "SPOT" output node.

In some embodiments, the neural network 200 has an input layer 210 of nodes that encodes this input using "one-hot" encoding. That is, one input node exists for each linguistic unit in a dictionary of linguistic units that could be used. The dictionary need not be a comprehensive dictionary, such as a complete English dictionary, but can exist as a subset of characters, words, or phrases used in language. For example, if the ordered list of linguistic units is a word in the English language, the dictionary may be the list of letters A-Z, all letters capital (A-Z) and lowercase (a-z) and punctuation marks, or some subset thereof. If the ordered list of linguistic units is an English phrase, the dictionary may include all, or some, words in the English language. For example, if the system is to be trained on a specific book or corpus of text, English words not used in the book or corpus may be omitted. In some embodiments, dictionaries may further include compound terms that include more than one word, such as "San Francisco", "hot dog", etc.

Figure 4:
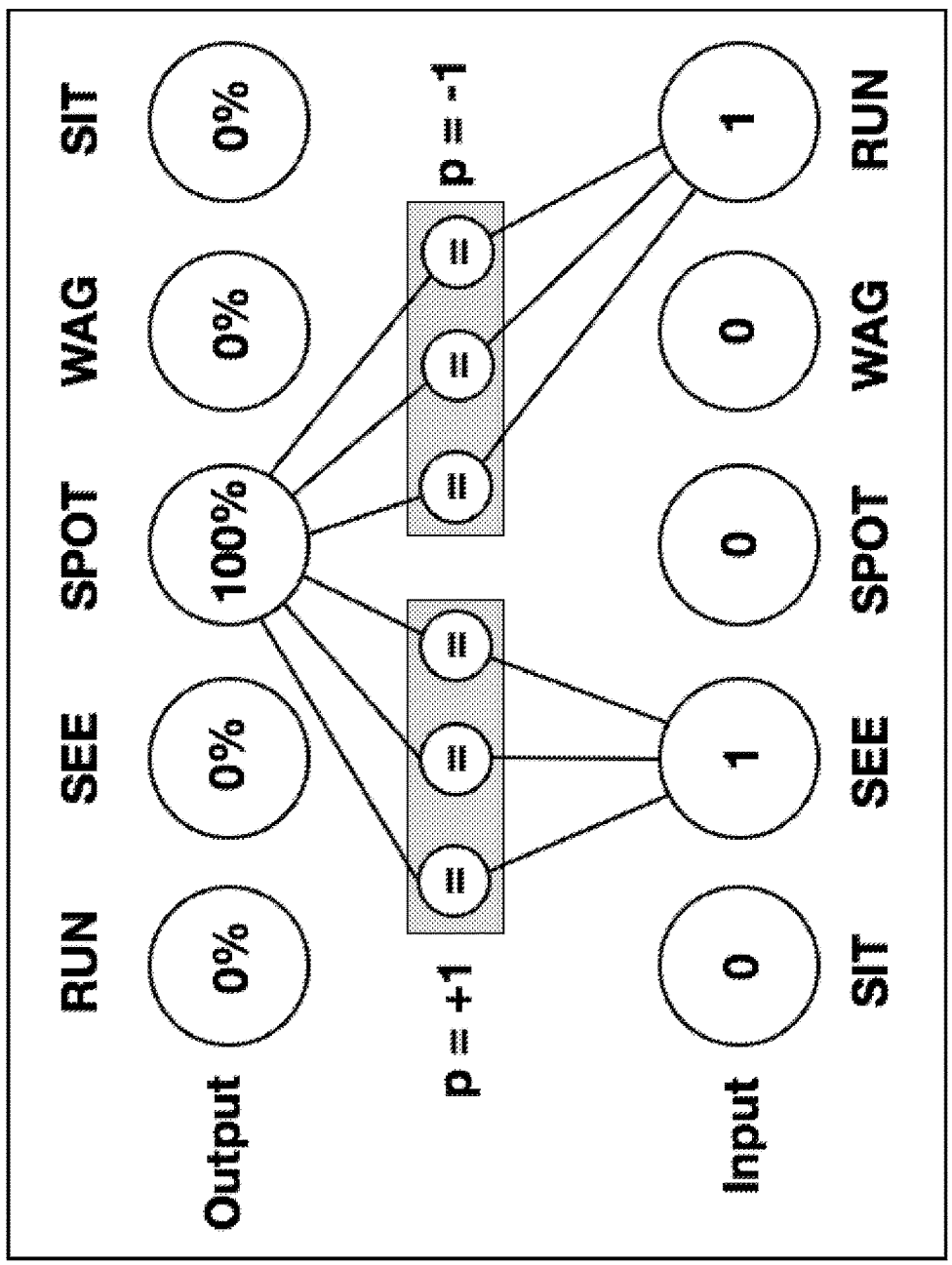
FIG. 4 depicts a windowed partitioned neural network language model in accordance with one embodiment.

In some embodiments, the neural network has a layer of hidden nodes 220. In some embodiments, this layer of hidden nodes 220 may be divided into partitions. Where a layer of hidden nodes is divided into partitions, it is referred to as a partitioned embedding neural network (PENN). In some embodiments, each partition relating to a position, or window, in a phrase (one word before the focus term, one word after the focus term, etc). This can be referred to as windowed embedding. FIG. 4 depicts a windowed partitioned embodiment having two partitions, one for the word immediately preceding the focus term (p=+1) and one for the word immediately following the focus term (p=−1). The network is shown here, analyzing the phrase "SEE SPOT RUN," where the focus term is "SPOT." Here, three hidden nodes are used for the p=+1 partition, and three hidden nodes are used for the p=−1 partition. Again, as a result of inputting "SEE" to the p=+1 partition, and "RUN" to the p=−1 partition, the network predicts that the focus term is "SPOT."

Figure 5:
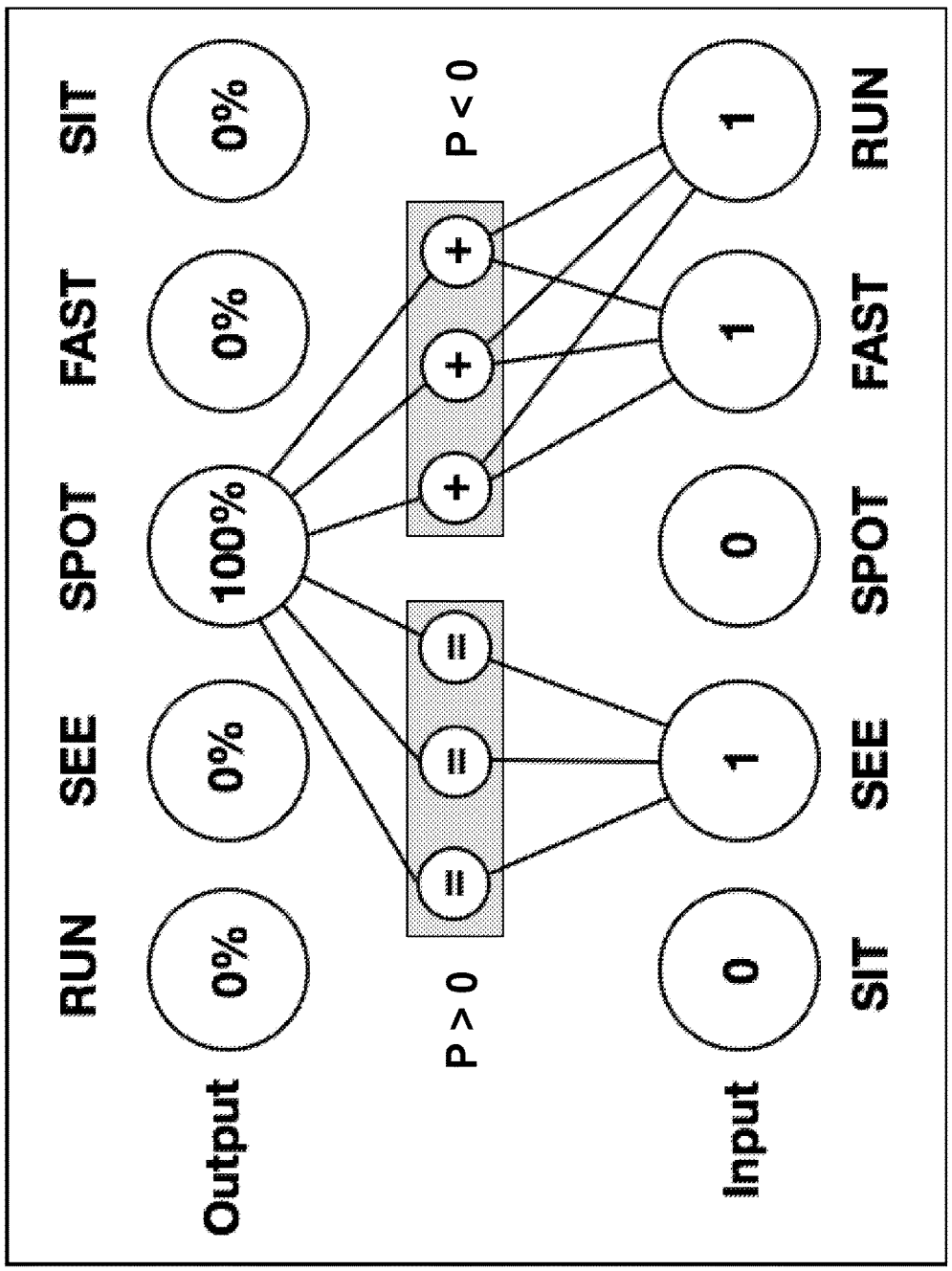
FIG. 5 depicts a directional partitioned neural network language model in accordance with one embodiment.

In some embodiments, each partition may relate to a direction in the phrase (all words before the focus term, all words following the focus term, etc.). This can be referred to as directional embedding. As would be recognized by one having skill in the art, the approaches can be combined in numerous permutations, such as an embodiment having a partition for the linguistic unit two windows before the focus term, and a partition for all linguistic units following the focus term, and other permutations. FIG. 5 depicts a directional partitioned embodiment having one partition for all words prior to the focus term (P>0), and one partition for all words following the focus term (P<0). Here, the neural network is analyzing the phrase "SEE SPOT RUN FAST" where the focus term is "SPOT." As shown, the word "SEE" is input to the P>0 partition, and the words "FAST" and "RUN" are input to the P<0 partition. The neural network then returns the focus term "SPOT."

Where partitions are used, in some embodiments, a separate set of input nodes is used for each partition. Alternatively, the set of input nodes may be modeled as specialized nodes capable of outputting a separate output to each partition. Both are mathematically equivalent. For simplicity of understanding, the present description refers to sets of input nodes for each separate partition, but in each instance where separate input nodes are used for each partition, a single set of input nodes feeding forward different values to different partitions could be used.

As discussed above, each node in each partition of the hidden layer will have a set of weights associated with it, represented by a vector x. In some embodiments, vector x will have as many elements as input nodes associated with the partition. In some embodiments, some hidden layer nodes in a given partition may feed forward from fewer than all input nodes associated with that partition. This can be modeled either as a vector x having fewer elements than the number of input nodes associated with that partition, or a vector of equivalent length with the omitted term weights set to zero. Each hidden node may further have a bias term—a weight associated with an input node—that is either not multiplied by anything, or multiplied by 1 and added to the result. The weights for all hidden nodes in a partition of the hidden layer can be represented by a matrix formed by concatenating the vectors for each node in the hidden layer of nodes. This matrix can be referred to as a "synapse" matrix. Because it is the first set of nodes from the input layer, it is referred to as synapse 0 (syn0). Further, this matrix can be referred to as an "embedding matrix."

$$syn_0 = [w_1 \ldots w_k] = \begin{bmatrix} w_{0,0} w_{0,1} & \ldots & w_{0,j} w_{1,0} w_{1,1} \\ \vdots & \ddots & \vdots \\ w_{k,0} & \ldots & w_{k,j} \end{bmatrix}$$

In some embodiments, there is only a single hidden layer, although in some embodiments there may be two or more hidden layers. In embodiments having multiple hidden layers, there may be the same number of partitions as the previous layer, more, or fewer. In some embodiments, an additional hidden layer may not have partitions at all.

In some embodiments, the last hidden layer is followed by an output layer. In some embodiments, the output layer can have one output neuron associated with each linguistic unit in a dictionary of linguistic units. In some embodiments, there are fewer sets of output nodes than partitions in the previous hidden layer, which takes as inputs the outputs of more than one partition in the last hidden layer of nodes. In some embodiments, there is a single set of output nodes, each node receiving as input the output of all nodes in the previous layer. In some embodiments, there is a separate set of output nodes associated with each partition in the last hidden layer of nodes.

CLOW

In some embodiments, a neural network of the present disclosure can be trained using a continuous list of words (CLOW) training style. The CLOW training style under the PENN framework optimizes the following objective function:

$$\arg\max_\theta \left( \prod_{(w,C) \in d} \prod_{-c \leq j \leq c, j \neq 0} p(c_j^i; \theta) \prod_{(w,C) \in d'} \prod_{-c \leq j \leq c, j \neq 0} p(w = 0 \mid c_j^i; \theta) \right)$$

where $c_j^i$ is the location specific representation (partition j) for the word at window position j relative to the focus word w.

In this training style, the output layer is configured as a single set (or single partition) of nodes receiving input from each node in the previous hidden layer. The neural network is then trained on a linguistic corpus, which is one or more sequences of a plurality of linguistic units. One or more training examples are run, where for each training example, the words surrounding the focus term are input into their respective input nodes corresponding to the appropriate partitions. For example, if the linguistic corpus includes the phrase "SEE SPOT RUN FAST," and "SPOT" is the focus term, the input nodes associated with the position one-ahead of the focus term would be activated according to the term "SEE", and the position one-behind the focus term would be activated according to the term "RUN". Those inputs are propagated through the neural network to produce an output. The output of the neural network, which correlates with the percent chance that the output word is the focus term, is then compared to a preferred output where the focus term ("SPOT") is 100% (or a corresponding maximum output value) and the output for all other linguistic units is 0% (or a corresponding minimum output value). The actual output is compared to the preferred output, and then back-propagated through the neural network to update the synapse matrices according to one or more known back-propagation algorithms. This process can be repeated on additional sequences in the linguistic corpus, until the network is sufficiently accurate.

In some embodiments, the directional CLOW implementation with very small window sizes (pictured with a window size of 1) can be used to achieve acceptable performance. Directional CLOW is able to achieve a parity score using a window size of 1, contrasted with word2vec using a window size of 10 when all other parameters are equal. In some embodiments, this optimization can reduce the number of training examples and overall training time by a factor of 10.

Skip-Gram

In some embodiments, a neural network of the present disclosure can be trained using a "skip-gram" training style. The skip-gram training style optimizes the following objective function:

$$\arg\max_\theta \left( \prod_{(w,C)\in d} \prod_{-c\leq j\leq c, j\neq 0} p(c_j^i; \theta) \prod_{(w,C)\in d'} \prod_{-c\leq j\leq c, j\neq 0} p(w=0 \mid c_j^i; \theta) \right)$$

where $c_j^i$ is the location specific representation (partition j) for the word at window position j relative to the focus word w.

In this training style, a network is configured having separate output partitions for each hidden layer partition. Thus, in the example listed above, the neural network would consist of two neural networks, one modeling the probability that the focus term is a given value based on the word in the position one-ahead of the focus term, and one modeling the probability that the focus term is a given value based on the word in the position one after the focus term. In other words, if the linguistic corpus includes the phrase "SEE SPOT RUN FAST," and "SPOT" is the focus term, one partition will receive as input "SEE", and one partition will receive as input "RUN." The corresponding output nodes will then generate an output. This actual output is compared with a preferred output where the focus term ("SPOT") is 100% (or a corresponding maximum output value) and the output for all other linguistic units is 0% (or a corresponding minimum output value). The actual output is compared to the preferred output, and then back-propagated through the neural network to update the synapse matrices according to any back-propagation algorithm, as is known in the art of neural networks. This process can be repeated on additional sequences in the linguistic corpus, until the network is sufficiently accurate. After training, to arrive at a final result, the outputs of the various output partitions can be added together, or otherwise combined to produce a final probability of the focus term.

In some embodiments, the skip-gram training style can be used to train a neural network in parallel. That is, each separate partition of hidden nodes, and partition of output nodes can be trained independently of other partitions of hidden nodes and output nodes. Thus those embodiment could be trained using multiple threads on a single computer processor, or on multiple computers operating in parallel.

In some embodiments, when skip-gram is used to model ordered sets of words under the PENN framework, each classifier partition and its associated embedding partitions can be trained in full parallel reach the same state as if they were not distributed. In some embodiments, the training can be accomplished by multiple computers with no intercommunication at all. In some embodiments, the windowed embedding configuration can trained all window positions in full parallel and concatenate embeddings and classifiers at the end of training. Given machine j, the following objective function is optimized:

$$\arg\max_\theta \left( \prod_{(w,C)\in d} p(c_j^i; \theta) \prod_{(w,C)\in d'} p(c_j^i; \theta) \right)$$

where $c_j^i$ is the location specific representation (partition j) for the word at window position j relative to the focus word w.

Concatenation of the weight matrices $syn_0$ and $syn_1$ then incorporates the sum over j back into the PENN skip-gram objective function during the forward propagation process, yielding identical training results as a network trained in a single-threaded, single-model PENN skip-gram fashion. This training style achieves parity training results with current state-of-the-art methods while training in parallel over as many as j separate machines.

DIEM

In some embodiments, syntactic tasks can be performed by a process called dense interpolation embedding (DIEM). In this technique, characteristic vectors for larger, compound linguistic units (such as words) can be calculated from embeddings generated on smaller linguistic units (such as letters). Because word or phrase structure correlates more with syntax than semantic meaning, such a technique performs better on syntactic analogy tasks. To perform this method, characteristic vectors are first calculated for the smaller linguistic units using a neural network in accordance with an embodiment. A characteristic vector for a larger linguistic unit can then be calculated by interpolating the embeddings for the smaller linguistic unit over the larger linguistic unit. For example, where the smaller linguistic unit is a letter, and the larger linguistic unit is a word, characteristic vectors for words can be generated according to the following pseudocode:

INPUT: wordlength I, list char embeddings (e.g., the word) char, multiple M, char dim C, vector $v_m$.

```
for i = 0 to I - 1 do
    s = M * i / I
    for m = 0 to M - 1 do
        d = pow(1 - (abs(s - m)) / M, 2)
        vm = vm + d * char_i
    end for
end for
```

The final embedding size can be selected as a multiple M of the character embedding dimensionality C, such that the final embedding contains M buckets of length C. Within each bucket of the final embedding, every character's embedding is summed according to a weighted average. This weighted average is determined by the variable d above. This variable compares the squared percent distance between the character's position i in the word of length I and the bucket's position m in the sequence of M buckets. This is computed such that the far left character is of approximate distance 0% from the far left bucket, and the far right character is of approximate distance 100% from the far right bucket. 1 minus this distance, squared, is then used to weight each respective character's embedding into each respective bucket. For example, the percentage distance across a word of length 4 is 0%, 33%, 66%, and 100% (from left to right across the word). The percentage distance across a sequence of buckets of length 3 is 0%, 50%, and 100%. Thus, the distance between character 1 and bucket 3 is (0%-100%). Squaring this equals 100%. One minus this square is 0%. Thus, character 1 in bucket 3 would have a weight of 0% (nothing). The opposite would be true for character 4 and bucket 3, as they both lie at the far right position in their respective sequences.

For each character in a word, its index i is first scaled linearly with the size of the final "syntactic" embedding such that s=M*i/I. Then, for each length C position m (out of M positions/buckets) in the final word embedding vm, a squared distance is calculated relative to the scaled index such that distance d=pow(1−(abs(s−j))/M,2). The character vector for the character at position i in the word is then scaled by d and added element-wise into position j of vector v.

In some embodiments, a dense interpolation embedding method can be accomplished more efficiently by caching a set of transformation matrices, which are cached values of $d_{i,j}$ for words of varying size. These matrices can be used to transform variable length concatenated character vectors into fixed length word embeddings via vector-matrix multiplication.

Syntactic vectors in accordance with some embodiments also provide significant scaling and generalization advantages over semantic vectors. For example, new syntactic vectors may be easily generated for words never before seen, giving loss-less generalization to any word from initial character training, assuming only that the word is made up of characters that have been seen. Syntactic embeddings can be generated in a fully distributed fashion and only require a small vector concatenation and vector-matrix multiplication per word. Further, in some embodiments, character vectors (typically length 32) and transformation matrices (at most 20 or so of them) can be stored very efficiently relative to the semantic vocabularies, which can be several million vectors of dimensionality 1000 or more. In some embodiments, DIEM optimally performs using 6+ orders of magnitude less storage space, and 5+ orders of magnitude fewer training examples than word-level semantic embeddings.

The PENN framework models the probability of a word occurring given the words surrounding it. Changing the partitioning strategy modifies this probability distribution by capturing (or ignoring) various synergies. Modeling every permutation of window position around a focus word approaches the full distribution, or the full conditional probability of the focus word occurring given the position and value of each and all of the words in the context surrounding it.

Modeling every distribution allows every potential synergy to be captured in the combined embedding. The number of permutations possible in this partitioning strategy can easily exceed several hundred given a window size of 10 or more with each trained model containing billions of parameters. However, similar word partitioning strategies yield similar word embeddings and by extension, similar word-analogy quality in each sub-task. Thus, some embodiments can approximate the varying perspectives generated using the full co-occurrence distribution with fewer trained models by training sufficiently different models and concatenating them. Such a method uses different probability distributions to generate word embeddings modeling different perspectives on each word in the vocabulary. Character-derived vectors also embed a unique perspective by capturing information from the characters of a word instead of the contexts in which a word occurs. Because the embedding represents syntactic relationships between words from a unique perspective, the concatenation method in accordance with embodiments described above may be generalized to include the DIEM vectors.

Analogy Tasks

A related aspect of neural networks in accordance with some embodiments is that the embedding matrix Syn0 can be used for analogy tasks. In the same way that each row may represent all the inputs to a specific neuron, each row represents a specific word's characteristic "embedding" in the neural network. A word's embedding can be a vector corresponding to all or a subset of the synapse weights for a single partition, or all or a subset of all partitions, or variations thereof.

These characteristic word embeddings can be used to perform analogy tasks. For example, the analogy "king is to queen as man is to woman" can be encoded as king-queen=man-woman. That is, each word can be represented as a characteristic vector of embeddings, and each relationship as a difference between the two characteristic vectors. Using the king/queen example, a neural network in accordance with an embodiment can be used to derive the answer "woman" to the question "king is to queen as man is to what?" (king-queen=man-?). The problem can be solved by rearrangement of operations to man-king+queen=?. This results in a solution vector that can then converted to an answer word by comparing the solution vector to the embedding vector for each word in the dictionary using cosine similarity. That is:

$$\text{similarity} = \cos(\theta) = \frac{\text{solution} \cdot \text{word}}{|\text{solution}||\text{word}|} = \frac{\sum_{i=1}^{n} \text{solution}_i \text{word}_i}{\sqrt{\sum_{i=1}^{n} \text{solution}_i^2} \sqrt{\sum_{i=1}^{n} \text{word}_i^2}}$$

By searching the characteristic vectors for the words in the dictionary, and finding a word with the smallest cosine distance (and thus the highest degree of similarity) will usually result in finding the answer "woman." Depending on the structure of the network, degree of training, other results, such as "girl" or "female" may occur, however "woman" is almost always among the most similar words.

The above example given is a semantic task, however syntactic analogies can also be performed. For example, the question "running is to run as pruning is to ?" may similarly be performed with an embodiment of the disclosure. Among the top results there will be "pruning," which shares a common syntax, though very different semantic meaning.

In some embodiments, the word embeddings learned via neural language models can share resources between multiple languages. By pre-training over both languages, semantic relationships between languages can be encoded into the embeddings. In some embodiments, for example, simple vector arithmetic of stop words between English and Spanish can approximate machine translation:

("film")−("is")+("es")=("pelicula")

This vector operation subtracts an English stop word ("is") from an English noun and adds the equivalent Spanish stop word ("es") to the embedding. The equation returns the Spanish word for film ("pelicula"). This suggests that the neural language pre-training map words into vector space in such a way that language becomes another dimension that the distributed representations model. In some embodiments, this property of the embeddings enables a sentiment model trained in one language to predict on another. In some embodiments, a sentiment trained in one language will predict on another better where there is a shared vocabulary between languages. In some embodiments, during pre-training, the neural language models can construct a hidden layer using neurons sampled according to vocabulary frequencies. In this way, the hidden layer construction for each language will be similar despite having completely different input layer representations. The consistency in the hidden layer can enable the alignment of semantic concepts in vector space. This alignment can enable sentiment prediction across languages.

Implementations and Results

The following describes implementations of various aspects of the disclosure and corresponding results. Some experimental data are presented herein for purposes of illustration and should not be construed as limiting the scope of the present disclosure in any way or excluding any alternative or additional embodiments.

The present inventors conducted experiments on word-analogy tasks made up of a variety of word similarity tasks. Specifically, the Google Analogy Dataset was used, which contains 19,544 questions, split into semantic and syntactic sections. Both sections are further divided into subcategories based on analogy type. Each analogy task is phrased as a question "A is to B as C is to ?".

All training was performed over the dataset available from the Google word2vec website (https://code.google.com/p/word2vec), using the packaged word-analogy evaluation script. The dataset contains approximately 8 billion words collected from English News Crawl, 1-Billion-Word Benchmark, UMBC Webbase, and English Wikipedia. The dataset used leverages the default data-phrase2.txt normalization in all training, which includes both single tokens and phrases. Unless otherwise specified, all parameters for training and evaluating are identical to the default parameters specified in the default word2vec big model.

Figure 6:
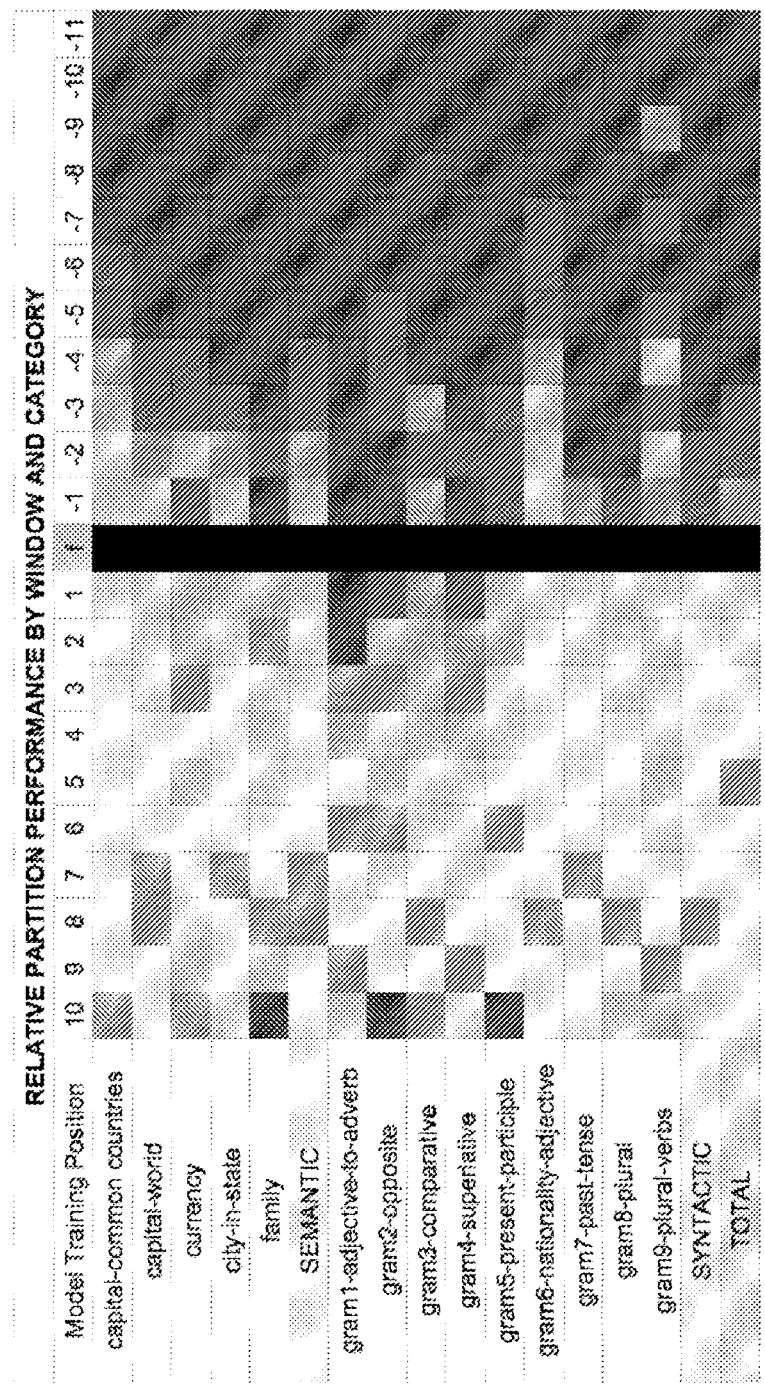
FIG. 6 depicts the relative accuracy of each partition in a PENN model as judged by row-relative word analogy scores.

FIG. 6 displays the relative accuracy of each partition in a PENN model as judged by row-relative word-analogy scores. Other experiments indicated that the pattern present in the heat-map is consistent across parameter tunings. There is a clear quality difference between window positions that predict forward (left side of the figure) and window positions that predict backward (right side of the figure). "Currency" achieves most of its predictive power in short range predictions, whereas "capital-common countries" is a much smoother gradient over the window.

These patterns support the intuition that different window positions play different roles in different tasks.

TABLE A

| Configuration Style | W2V | D | W & D |
|---|---|---|---|
| Training Style | CBOW | CLOW | CLOW |
| Word Vector Size | 500 | 500 | 500 |
| Partition Size | 500 | 250 | 250 |
| Window Size | 10 | 10 | 1 |
| capital-common | 89.72 | 92.29 | 94.86 |
| capital-world | 92.11 | 92.46 | 90.96 |
| currency | 14.63 | 19.95 | 12.37 |
| city-in-state | 78.76 | 72.48 | 69.56 |
| family | 82.81 | 86.76 | 85.18 |
| SEMANTIC TOTAL | 81.02 | 80.19 | 78.07 |
| adjective-to-adverb | 37.70 | 35.08 | 35.08 |
| opposite | 36.21 | 40.15 | 37.93 |
| comparative | 86.71 | 87.31 | 93.39 |
| superlative | 80.12 | 82.00 | 87.25 |
| present-participle | 77.27 | 80.78 | 83.05 |
| nationality-adjective | 90.43 | 90.18 | 88.49 |
| past-tense | 72.37 | 73.40 | 75.90 |
| plural | 80.18 | 81.83 | 74.55 |
| plural-verbs | 58.51 | 63.68 | 78.97 |
| SYNTACTIC TOTAL | 72.04 | 73.45 | 74.59 |
| COMBINED TOTAL | 76.08 | 76.49 | 76.16 |

Table A shows the performance of the default CBOW implementation of word2vec relative to the directional configuration. Most prominently, PENN outperforms the word2vec implementation using only a window size of 1, whereas word2vec was parameterized with the default of 10. Furthermore, it can be seen that increasing dimensionality of baseline CBOW word2vec past 500 achieves suboptimal performance. Thus, a fair comparison of two models should be between optimal (as opposed to equal) parameterization for each model. This is especially important given that PENN models are modeling a much richer probability distribution, given that order is being preserved. Thus, optimal parameter settings often require larger dimensionality. Additionally in this table, it can be seen that, unlike the original CBOW word2vec, bigger window size is not always better. Larger windows tend to create slightly more semantic embeddings, whereas smaller window sizes tend to create slightly more syntactic embeddings. This follows the intuition that syntax plays a large role in grammar, which is dictated by rules about which words make sense to occur immediately next to each other. Words that are +5 words apart cluster based on subject matter and semantics as opposed to grammar. With respect to window size and overall quality, because partitions slice up the global vector for a word, increasing the window size decreases the size of each partition in the window if the global vector size remains constant. Since each embedding is attempting to model a very complex (hundreds of thousands of words) probability distribution, the partition size in each partition must remain high enough to model this distribution. Thus, modeling large windows for semantic embeddings is optimal when using either the directional embedding model, which has a fixed partition size of 2, or a large global vector size. The directional model with optimal parameters has slightly less quality than the windowed model with optimal parameters due to the vector averaging occurring in each window pane.

TABLE B

| SEMANTIC | | SYNTACTIC | |
|---|---|---|---|
| "general" - similarity | | | |
| secretary | 0.619 | gneral | 0.986 |
| elections | 0.563 | genral | 0.978 |
| motors | 0.535 | generally | 0.954 |
| undersecretary | 0.534 | generation | 0.944 |
| "see" - "see" + "bank" ≅ | | | |
| firestone | 0.580 | banks | 0.970 |
| yard | 0.545 | bank | 0.939 |
| peres | 0.506 | balks | 0.914 |
| c.c | 0.500 | bans | 0.895 |

Table B documents the change in syntactic analogy query quality as a result of the interpolated DIEM vectors. For the DIEM experiment, each analogy query was first performed by running the query on CLOW and DIEM independently, and selecting the top thousand CLOW cosine similarities. The present inventors summed the squared cosine similarity of each of these top thousand with each associated cosine similarity returned by the DIEM, and resorted. This was found to be an efficient estimation of concatenation that did not reduce quality.

Final results show a lift in quality and size over previous models with a 40% syntactic lift over other results. Within PENN models, there exists a speed versus performance tradeoff between SG-DIEM and CLOW-DIEM. Unlike word2vec where SG was both slower and higher quality, CLOW is the slower model and achieves a higher score. In this case, the present inventors achieve a 20× level of parallelism in SG-DIEM relative to CLOW, with each model training partitions of 250 dimensions (250*20=5000 final dimensionality). A 160 billion parameter network was also trained overnight on 3 multi-core CPUs, however it yielded 20000 dimensional vectors for each word and subsequently overfit the training data. This is because a dataset of 8 billion tokens with a negative sampling parameter of 10 has 80 billion training examples. Having more parameters than training examples overfits a dataset, whereas 40 billion performs at parity with current state of the art.

FIG. 6 displays the relative accuracy of each partition in a PENN model as judged by row-relative word-analogy scores. Other experiments indicated that the pattern present in the heat-map is consistent across parameter tunings. There is a clear quality difference between window positions that predict forward (left side of the figure) and window positions that predict backward (right side of the figure). "Currency" achieves most of its predictive power in short range predictions, whereas "capital-common countries" is a much smoother gradient over the window. These patterns support the intuition that different window positions play different roles in different tasks.

TABLE C

| Semantic Architecture | CBOW | CLOW | DIEM |
|---|---|---|---|
| Semantic Vector Dim. | 500 | 500 | 500 |
| SEMANTIC TOTAL | 81.02 | 80.19 | 80.19 |
| adjective-to-adverb | 37.70 | 35.08 | 94.55 |
| opposite | 36.21 | 40.15 | 74.60 |
| comparative | 86.71 | 87.31 | 92.49 |
| superlative | 80.12 | 82.00 | 87.61 |
| present-participle | 77.27 | 80.78 | 93.27 |
| nationality-adjective | 90.43 | 90.18 | 71.04 |
| past-tense | 72.37 | 73.40 | 47.56 |
| plural | 80.18 | 81.83 | 93.69 |
| plural-verbs | 58.51 | 63.68 | 95.97 |
| SYNTACTIC TOTAL | 72.04 | 73.45 | 81.53 |
| COMBINED SCORE | 76.08 | 76.49 | 80.93 |

TABLE D

| Configuration Style | W2V | D | W & D |
|---|---|---|---|
| Training Style | CBOW | CLOW | CLOW |
| Word Vector Size | 500 | 500 | 500 |
| Partition Size | 500 | 250 | 250 |
| Window Size | 10 | 10 | 1 |
| capital-common | 89.72 | 92.29 | 94.86 |
| capital-world | 92.11 | 92.46 | 90.96 |
| currency | 14.63 | 19.95 | 12.37 |
| city-in-state | 78.76 | 72.48 | 69.56 |
| family | 82.81 | 86.76 | 85.18 |
| SEMANTIC TOTAL | 81.02 | 80.19 | 78.07 |
| adjective-to-adverb | 37.70 | 35.08 | 35.08 |
| opposite | 36.21 | 40.15 | 37.93 |
| comparative | 86.71 | 87.31 | 93.39 |
| superlative | 80.12 | 82.00 | 87.25 |
| present-participle | 77.27 | 80.78 | 83.05 |
| nationality-adjective | 90.43 | 90.18 | 88.49 |
| past-tense | 72.37 | 73.40 | 75.90 |
| plural | 80.18 | 81.83 | 74.55 |
| plural-verbs | 58.51 | 63.68 | 78.97 |
| SYNTACTIC TOTAL | 72.04 | 73.45 | 74.59 |
| COMBINED TOTAL | 76.08 | 76.49 | 76.16 |

Tables C and D show the performance of the default CBOW implementation of word2vec relative to the directional configuration. Most prominently, PENN outperforms the word2vec implementation using only a window size of 1, whereas word2vec was parameterized with the default of 10. Furthermore, it can be seen that increasing dimensionality of baseline CBOW word2vec past 500 achieves suboptimal performance. Thus, a fair comparison of two models should be between optimal (as opposed to equal) parameterization for each model. This is especially important given that PENN models are modeling a much richer probability distribution, given that order is being preserved. Thus, optimal parameter settings often require larger dimensionality. Additionally in this table, it can be seen that, unlike the original CBOW word2vec, bigger window size is not always better. Larger windows tend to create slightly more semantic embeddings, whereas smaller window sizes tend to create slightly more syntactic embeddings. This follows the intuition that syntax plays a huge role in grammar, which is dictated by rules about which words make sense to occur immediately next to each other. Words that are +5 words apart cluster based on subject matter and semantics as opposed to grammar. With respect to window size and overall quality, because partitions slice up the global vector for a word, increasing the window size decreases the size of each partition in the window if the global vector size remains constant. Since each embedding is attempting to model a very complex (hundreds of thousands of words) probability distribution, the partition size in each partition must remain high enough to model this distribution. Thus, modeling large windows for semantic embeddings is optimal when using either the directional embedding model, which has a fixed partition size of 2, or a large global vector size. The directional model with optimal parameters has slightly less quality than the windowed model with optimal parameters due to the vector averaging occurring in each window pane.

Table B documents the change in syntactic analogy query quality as a result of the interpolated DIEM vectors. For the DIEM experiment, each analogy query was first performed by running the query on CLOW and DIEM independently, and selecting the top thousand CLOW cosine similarities. The present inventors summed the squared cosine similarity of each of these top thousand with each associated cosine similarity returned by the DIEM, and resorted. This was found to be an efficient estimation of concatenation that did not reduce quality. Final results show a lift in quality and size over previous models with a 40% syntactic lift over the best published result. Within PENN models, there exists a speed vs. performance tradeoff between SG-DIEM and CLOW-DIEM. Unlike word2vec where SG was both slower and higher quality, CLOW is the slower model and achieves a higher score. In this case, the present inventors achieved a 20× level of parallelism in SG-DIEM relative to CLOW, with each model training partitions of 250 dimensions (250*20=5000 final dimensionality). A 160 billion parameter network was also trained overnight on 3 multi-core CPUs, however it yielded 20000 dimensional vectors for each word and subsequently overfit the training data. This is because a dataset of 8 billion tokens with a negative sampling parameter of 10 has 80 billion training examples. Having more parameters than training examples overfits a dataset, whereas 40 billion performs at parity with current state of the art, as pictured in Table E.

TABLE E

| Algorithm | GloVe | Word2Vec | | PENN + DIEM | |
|---|---|---|---|---|---|
| Config | x | CBOW | SG | SG | CLOW |
| Params | x | 3.8 B | 3.8 B | 40B | 16B |
| Sem. Dims | 300 | 500 | 500 | 5000 | 2000 |
| Semantic | 81.9 | 81.0 | 82.2 | 69.6 | 82.3 |
| Syntactic | 69.3 | 72.0 | 71.3 | 80.0 | 81.5 |
| Combined | 75.0 | 76.1 | 76.2 | 75.3 | 80.9 |

The present inventors conducted further experiments to approximate the full conditional distribution of word embeddings. These experiments were likewise conducted on word-analogy tasks in the Google Analogy Dataset. This data set contains 19,544 questions asking "a is to b as c is to ?" and is split into 14 subcategories, 5 semantic and 9 syntactic.

The training occurs over the 'data-phrase2.txt' dataset available from the Google word2vec website using the packaged word-analogy evaluation script for querying each individual model. Because querying each semantic model requires as much as 128 gb of RAM, a normalized concatenation approximation was used similar to that in the experiments described above. Each analogy was queried against each semantic model in parallel, and the top 1000 results were saved. Each word's score was summed across the various models to create a global score for each word. The word with the maximum value was selected as the ensemble's prediction. In the present inventors' experiments, each score in every semantic model (PENN model) was raised to the power of 0.1 before being summed. This was found to normalize the models to similar confidence ranges.

For syntactic analogy queries, the top 100 words from the semantic step were selected used to create syntactic embeddings. The analogy query was then performed using the syntactic embeddings such that syntactic embedding based cosine distance scores were generated. These scores were summed element-wise with semantic scores in the original top 100 words. The top word was then selected as the final analogy answer. This step was skipped for analogies coming from semantic categories. Syntactic scores were normalized by raising them to the power of 10.

The experiment described below approximates the full conditional distribution by concatenating embeddings from a variety of configurations. These configurations are shown in Table F below:

TABLE F

| Training Style | Window Size | Dimensionality |
|---|---|---|
| WENN | 10 | 500 |
| DENN | 5 | 500 |
| WENN | 2 | 2000 |
| DENN | 5 | 2000 |
| DENN | 10 | 2000 |
| DENN | 1 | 500 |
| DIEM | x | 320 |

The results of these experiments is shown in Table G:

TABLE G

| | SG | PENN | FULL |
|---|---|---|---|
| capital-common | 94.47 | 92.29 | 95.65 |
| capital-world | 94.08 | 92.46 | 93.90 |
| currency | 15.82 | 19.95 | 17.32 |
| city-in-state | 81.15 | 72.48 | 78.88 |
| family | 67.00 | 86.76 | 85.38 |
| SEMANTIC | 82.17 | 80.19 | 82.70 |
| adjective-to-adverb | 41.53 | 94.55 | 90.73 |
| opposite | 37.32 | 74.60 | 73.15 |
| comparative | 86.04 | 92.49 | 99.70 |
| superlative | 71.21 | 87.61 | 91.89 |
| present-participle | 76.61 | 93.27 | 93.66 |
| nationality-adjective | 92.31 | 71.04 | 91.43 |
| past-tense | 64.81 | 47.56 | 60.01 |
| plural | 86.11 | 93.69 | 97.90 |
| plural-verbs | 58.85 | 95.97 | 95.86 |
| SYNTACTIC | 71.33 | 81.53 | 88.29 |
| TOTAL | 76.22 | 80.93 | 85.77 |

Note that adding additional models to the ensemble increased the overall score even when the model being added had a lower score than the ensemble already. At a granular level, this is a result of the uniqueness of the model being added. The word-analogy misses that the model produces are significantly different than the misses that the ensemble produces such that their combination achieves a higher score than either did apart.

Final results show a lift in quality over previous models with a 59.2% error reduction in syntactic scores and a 40.2% error reduction overall relative to word2vec. Training semantic word embeddings based on varying probability distributions, normalizing, and concatenating is beneficial for word-analogy tasks, achieving state-of-the-art performance on both semantic and syntactic categories by a significant margin. These results are based on the intuition that different distributions model different perspectives on the same word, the aggregate of which is more expressive than each embedding individually.

Experiments were further performed using embodiments to perform neural language modeling across different languages, all performed with the IMDB movie review corpus. The corpus consists of 100,000 movie reviews that are labeled for sentiment polarity (positive/negative). The reviews are split into training, testing and development sections. The training and testing sets have 25,000 reviews each with 12,500 positive and 12,500 negative reviews. The remaining 50,000 documents comprise the development set.

The present inventors used the Google Translate API to curate a Spanish movie review corpus. Systems such as Google's translation API have been evaluated by research in the NLP literature and are generally accepted as a mechanism with which to curate labeled data sets in new languages [1][2][3]. For each review in the original English IMDB corpus, an API request was made to the Google Translate API to translate the entire text of the review to Spanish. The resulting paragraph-level translations maintained the same polarity label as well as ID in order to maintain one-to-one comparisons between the Spanish and English corpora.

The present inventors used word2vec's skip-gram architecture to learn 100 dimensional feature representations for words in the corpus by using hierarchical softmax and negative sampling (with 10 samples) for the focus word representations. Pre-processing consists of lower-casing, separating words from punctuation, and removing HTML tags. After learning word representations, stop-words are filtered out using NLTK's [4] stop word corpus and review-level representations are created by averaging the features for each remaining word in the review.

The present inventors used Paragraph Vector's distributed bag-of-words (dbow) configuration to learn 100 dimensional feature representations for reviews by using both hierarchical softmax and negative sampling (with 10 samples) for the focus word representations. Pre-processing consists of lower-casing, separating words from punctuation, and removing HTML tags. Stop words are preserved in the reviews.

The present inventors used PENN's skip-gram architecture to learn 100 dimensional feature representations for words in the corpus by using negative sampling (with 10 samples) and no hierarchical softmax for the focus representations. Partitions from window positions −9 to −4 were used. The pre-processing and averaging steps are identical to the process described in the word2vec configuration section.

Model ensembling was performed using an augmented implementation of the recent work by [5]. For each corpus (English and Spanish) a validation word model and a full word model was trained. The validation word models (word2vec and PENN) are trained on 20,000 reviews from the training sets (10,000 positive, 10,000 negative) and 50,000 reviews in the development sets. The remaining 5,000 reviews in the training sets are used as validation sets. The full word models are trained on the entire training sets and development sets. Paragraph Vector representations are learned using unsupervised pre-training over the entire corpus (training, development, and testing) using the implementation provided with [5].

Single language models pre-train English and Spanish word models independently from one another. The English and Spanish feature representations are learned in separate unsupervised models. Their evaluations act as a baseline with which to interpret the cross-language models in later experiments. Review-level representations are used as features in a support vector machine (SVM). A separate classifier was used for each language. The unsupervised models for English and Spanish never interact. Spanish models were evaluated against the Spanish test set and English models against the English test set. The resulting scores for these models are provided in Table H.

TABLE H

| Pre-Training | Training | Target Language | Model | Percent Accuracy |
|---|---|---|---|---|
| English | English | English | Word2Vec | 88.42 |
| | | | Paragraph Vector | 88.55 |
| | | | PENN | 87.90 |
| | | | Ensemble | 89.22 |
| Spanish | Spanish | Spanish | Word2Vec | 87.31 |
| | | | Paragraph Vector | 85.3 |
| | | | PENN | 82.25 |
| | | | Ensemble | 86.63 |

Cross-language models pre-train using both English and Spanish to learn representations. The English and Spanish feature representations are learned in the same unsupervised model. Review-level representations are used as features in an SVM. The classifier is trained on English examples. No training is performed over the Spanish corpus. The features learned in the cross-language pretraining allow feature resources to be shared between both Spanish and English. The resulting models are evaluated on the Spanish corpus. The scores for these models are provided in Table I.

TABLE I

| Pre-Training | Training | Target Language | Model | Percent Accuracy |
|---|---|---|---|---|
| English + Spanish | English | English | Word2Vec | 77.54 |
| | | | Paragraph Vector | 86.02 |
| | | | PENN | 78.33 |
| | | | Ensemble | 85.11 |
| English + Spanish | English | Spanish | Word2Vec | 80.08 |
| | | | Paragraph Vector | 78.86 |
| | | | PENN | 77.54 |
| | | | Ensemble | 85.51 |

Bilingual feature models ensemble single language models with cross-language models. the present inventors leverage ID mappings between the English and Spanish corpora to ensemble each combination of pretraining and training routines mentioned in the previous section. Furthermore, ngram models (no pre-training) were incorporated that are trained in English. The first n-gram model is an Averaged Perceptron with high affinity n-gram features (chosen through Person's as proposed in [6]). The second n-gram model is a Naive Bayes SVM as proposed in [7]. Maintaining IDs between the languages allows for obtaining multiple predictions for each review: some models predict on the English translation of the review, other models predict on the Spanish translation of the review, creating an ensembled review sentiment score. This ensembling exceeds the state-of-the-art for IMDB polarity classification. These scores are provided in Table J below:

TABLE J

| Pre-Training | Training | Target Language | Model | Percent Accuracy |
|---|---|---|---|---|
| English | English | English | Word2Vec | 88.42 |
| | | | Paragraph Vector | 88.55 |
| | | | PENN | 87.90 |
| | | | Ensemble | 89.22 |
| Spanish | Spanish | Spanish | Word2Vec | 87.31 |
| | | | Paragraph Vector | 85.30 |
| | | | PENN | 82.25 |
| None | English | English | NBSVM-TRI | 91.87 |
| | | | Averaged Perceptron | 87.75 |
| | Full Ensemble | | | 94.20 |
| | Previous State-of-the-Art | | | 92.57 |

The present inventors' experiments demonstrate the efficacy of neural language modeling for cross-language sentiment classification. Neural language models encode meaningful relationships between words by mapping them to vector space, and this property of their embeddings helps explain why the cross-language models can effectively predict on languages on which they have not trained. The present inventors employ three different techniques for unsupervised pre-training and show that each technique is capable of encoding semantic relationships across languages. The present inventors trained baseline, single language models with which to compare the cross-language predictions (Table H). The highest baseline score for Spanish is 87.31% (word2vec) and the ensemble score is 86.63%. Using the baseline scores for comparison, the present inventors evaluate cross-language models on the Spanish corpus. Without training on Spanish, the models are able to classify polarity with 80% accuracy, and when these same models are ensembled together they classify polarity with an accuracy of 85.51% (Table I). Thus, the present inventors achieve a margin of 2% between the baseline, single language models and cross-language models. The overall accuracy of the cross-language models increases by 5% when they are ensembled. This behavior suggests that pretraining for each language captures slightly different patterns and structure that ultimately help the classifier accurately predict labels for those examples near the decision boundary.

Further to the examples described above for implementing various aspects of the present disclosure across various fields of application, aspects of the present disclosure may be implemented in numerous other fields, including but not limited to healthcare, for instance in real-time clinical monitoring and historical reporting on patient populations. Some embodiments described herein may be applied in clinical decision support and other tasks that require summaries of unstructured text. In one example use case, aspects of the present disclosure can be used for modeling the likelihood of a patient developing an infection, including full body systemic infection. More generally speaking, aspects of the present disclosure may be used for predicting whether or not a patient will develop a particular health condition. Electronic health records (EHR) for various patients may be used with aspects of the present disclosure as described above in order to learn representations of the positions of nodes and using embeddings to predict whether a patient would develop an an infection. The locations of particular clusters in vector space can be representative of such likelihoods of developing certain conditions.

Figure 7:
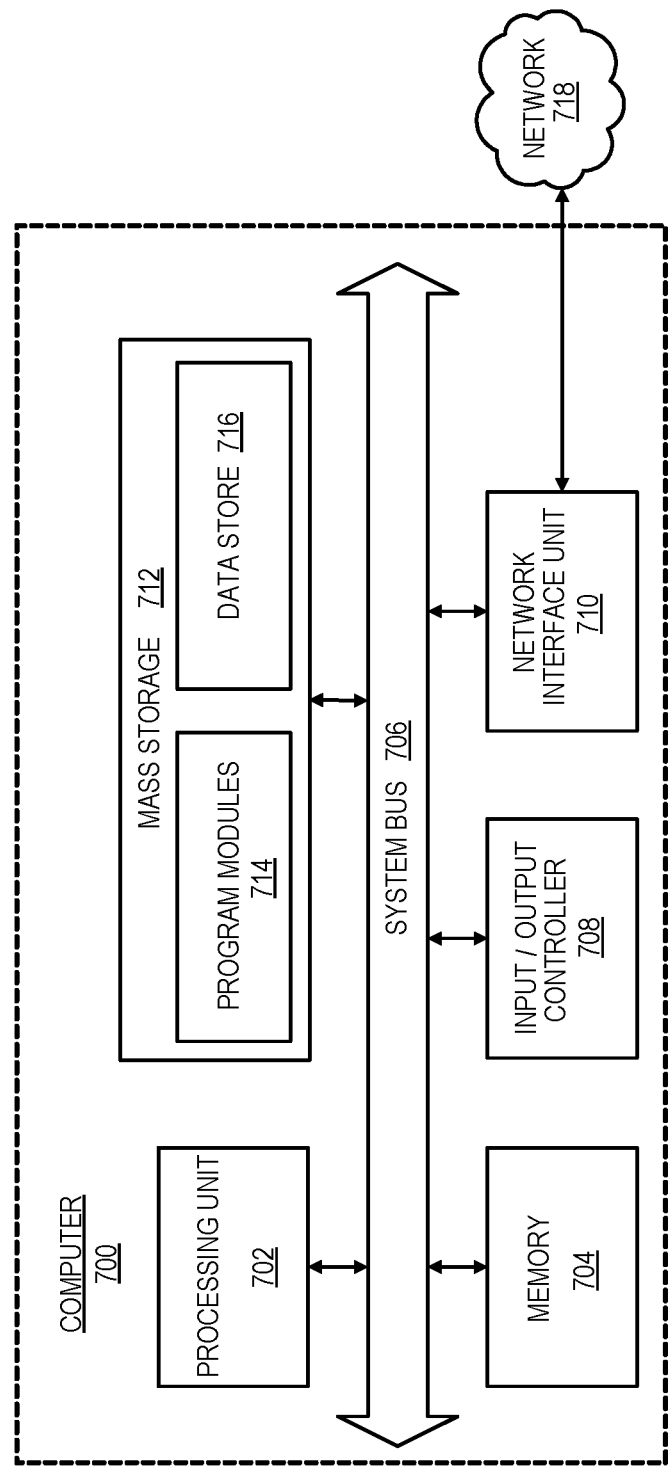
FIG. 7 is a computing architecture diagram of a computing system capable of implementing aspects of the present disclosure in accordance with one or more embodiments.

FIG. 7 is a computing architecture diagram of a computing system capable of implementing aspects of the present disclosure in accordance with one or more embodiments. The computing system includes a computer 700 that can be configured to perform one or more functions associated with the present disclosed technology. The computer 700 includes a processing unit 702, a system memory 704, and a system bus 706 that couples the memory 704 to the processing unit 702. The computer 700 further includes a mass storage device 712 for storing program modules 714. The program modules 714 can include computer-executable modules for performing the one or more functions associated with FIGS. 1-6. The mass storage device 712 further includes a data store 716. The mass storage device 712 is connected to the processing unit 702 through a mass storage controller (not shown) connected to the bus 706. The mass storage device 712 and its associated computer-storage media provide non-volatile storage for the computer 700. Although the description of computer-readable storage media contained herein refers to a mass storage device, such as a hard disk or CD-ROM drive, it should be appreciated by those skilled in the art that computer-readable storage media can be any available computer-readable storage medium that can be accessed and read by the computer 700.

By way of example, and not limitation, computer-readable storage media can include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700. Computer-readable storage media as described herein does not include transitory signals.

According to various embodiments, the computer 700 can operate in a networked environment using logical connections to remote computers through a network 718. The computer 700 can connect to the network 718 through a network interface unit 710 connected to the bus 706. It should be appreciated that the network interface unit 710 can also be utilized to connect to other types of networks and remote computer systems. The computer 700 can also include an input/output controller 708 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface such as a graphical user interface for managing various functions performed by the computer 700. The bus 706 can enable the processing unit 702 to read code and/or data to/from the mass storage device 712 or other computer-storage media. The computer-readable storage media can represent apparatus in the form of storage elements that are implemented using any suitable technology, including but not limited to semiconductors, magnetic materials, optics, or the like. The program modules 714 include software instructions that, when loaded into the processing unit 702 and executed, cause the computer 700 to provide functions for neural language modeling in accordance with aspects of the present disclosure described herein with reference to exemplary embodiments.

The program modules 714 can also provide various tools or techniques by which the computer 700 can participate within the overall systems or operating environments using the components, flows, and data structures discussed throughout this description. In general, the program modules 714 can, when loaded into the processing unit 702 and executed, transform the processing unit 702 and the overall computer 700 from a general-purpose computing system into a special-purpose computing system. The processing unit 702 can be constructed from any number of transistors or other discrete circuit elements, which can individually or collectively assume any number of states. More specifically, the processing unit 702 can operate as a finite-state machine, in response to executable instructions contained within the program modules 714. These computer-executable instructions can transform the processing unit 702 by specifying how the processing unit 702 transitions between states, thereby transforming the transistors or other discrete hardware elements constituting the processing unit 702.

Encoding the program modules 714 can also transform the physical structure of the computer-storage media. The specific transformation of physical structure can depend on various factors, in different implementations of this description. Examples of such factors can include, but are not limited to: the technology used to implement the computer-storage media, whether the computer storage media are characterized as primary or secondary storage, and the like. For example, if the computer-storage media are implemented as semiconductor-based memory, the program module 714 can transform the physical state of the semiconductor memory, when the software is encoded therein. For example, the program modules 714 can transform the state of transistors, capacitors, or other discrete circuit elements constituting the semiconductor memory.

As another example, the computer-readable storage media can be implemented using magnetic or optical technology. In such implementations, the program modules 714 can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. It should be appreciated that other transformations of physical media are possible without departing from the scope of the present disclosure.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

REFERENCES

[1] Balahur, Alexandra, and Marco Turchi. "Improving Sentiment Analysis in Twitter Using Multilingual Machine Translated Data." RANLP. 2013.

[2] Balahur, Alexandra, and Marco Turchi. "Multilingual sentiment analysis using machine translation?." Proceedings of the 3rd Workshop in Computational Approaches to Subjectivity and Sentiment Analysis. Association for Computational Linguistics, 2012.

[3] Wan, Xiaojun. "Using bilingual knowledge and ensemble techniques for unsupervised Chinese sentiment analysis." Proceedings of the Conference on Empirical Methods in Natural Language Processing. Association for Computational Linguistics, 2008.

[4] Bird, Steven. "NLTK: the natural language toolkit" Proceedings of the COLING/ACL on Interactive presentation sessions. Association for Computational Linguistics, 2006.

[5] Mesnil, Gr̀egoire, et al. "Ensemble of Generative and Discriminative Techniques for Sentiment Analysis of Movie Reviews." arXiv preprint arXiv:1412.5335 (2014).

[6] Manning, Christopher D. and Schutze, Hinrich. "Foundations of Statistical Natural Language Processing." 1999.

[7] Wang, Sida, and Christopher D. Manning. "Baselines and bigrams: Simple, good sentiment and topic classification." Proceedings of the 50th Annual Meeting of the Association for Computational Linguistics: Short Papers-Volume 2. Association for Computational Linguistics, 2012.

What is claimed is:

1. computer-implemented neural network, comprising:
a plurality of input neural nodes receiving input comprising an ordered list of a plurality of linguistic units with a linguistic unit omitted, each input neural node of the plurality of input neural nodes corresponding to a linguistic unit selected from the ordered list of a plurality of linguistic units, and wherein the input received by the input neural nodes is one-hot encoded;
an embedding layer comprising a plurality of embedding node partitions, wherein each of the embedding node partitions corresponds to a position in the ordered list relative to a focus term and comprises a plurality of neural nodes, wherein the focus term is an omitted linguistic unit from the ordered list of the plurality of linguistic units, the plurality of neural nodes of each of the embedding node partitions receiving an input from a separate set of the input neural nodes and generating an output by at least multiplying the input from each input neural node by one of a plurality of input weights; and
a classifier layer comprising a plurality of neural nodes, each neural node in the classifier layer configured to receive the output from each of the neural nodes of the embedding layer, to generate an output by at least multiplying the output from each neural node of the embedding layer by one of a plurality of input weights, and wherein the output corresponds to a probability that a particular linguistic unit is the focus term;
wherein the input weights for each neural node of a partition of the embedding layer are trained independently of other partitions.

2. The computer-implemented neural network of claim 1, wherein the linguistic unit is a character.

3. The computer-implemented neural network of claim 1, wherein the linguistic unit is a word.

4. The computer-implemented neural network of claim 1, wherein the positions relative to a focus term of the embedding node partitions are window positions relative to the focus term.

5. The computer-implemented neural network of claim 1, wherein the positions relative to a focus term of the embedding node partitions are directions relative to the focus term.

6. The computer-implemented neural network of claim 1, wherein the neural network is trained by performing functions that comprise:
- removing the focus term from the ordered list of linguistic units;
- selecting a partition from each remaining linguistic unit's embeddings based on that linguistic unit's position relative to the focus term;
- concatenating the partitions;
- propagating the partitions through the classifier layer; and
- updating weights for one or more neural nodes in the classifier layer and embedding layer based on accuracy of the classifier layer in predicting that the particular linguistic unit is the focus term.

7. The computer-implemented neural network of claim 1, wherein the neural network is trained by performing functions that comprise:
- training a first partition of the embedding node partitions by:
  - removing the focus term from the ordered list of linguistic units;
  - selecting a partition from each remaining linguistic unit's embeddings based on that respective linguistic unit's position relative to the focus term; and
  - updating weights for each neural node in the classifier layer and embedding layer based on accuracy of the classifier layer in predicting that the particular linguistic unit is the focus term.

8. The computer-implemented neural network of claim 7, wherein the neural network is trained by performing functions that further comprise:
- training a second partition by:
  - removing the focus term from the ordered list of linguistic units;
  - selecting a partition from each remaining linguistic unit's embedding based on that linguistic unit's position relative to the focus term; and
  - updating the weights based on accuracy of the classifier layer in predicting that the particular linguistic unit is the focus term,
- wherein the steps of training a first partition and training a second partition are performed in parallel.

9. The computer-implemented neural network of claim 1, wherein particular linguistic units are selected from the ordered list of the plurality of linguistic units and multiple linguistic domains associated with the selected particular linguistic units are modeled into a common vector space, wherein each of the multiple linguistic domains corresponds to a different language.

10. A system having one or more processors configured to implement:
- a plurality of input neural nodes receiving input comprising an ordered list of a plurality of linguistic units with a linguistic unit omitted, each input neural node of the plurality of input neural nodes corresponding to a linguistic unit selected from the ordered list of a plurality of linguistic units, and wherein the input received by the input neural nodes is one-hot encoded;
- an embedding layer comprising a plurality of embedding node partitions, wherein each of the embedding node partitions corresponds to a position in the ordered list relative to a focus term and comprises a plurality of neural nodes, wherein the focus term is an omitted linguistic unit from the ordered list of the plurality of linguistic units, the plurality of neural nodes of each of the embedding node partitions receiving an input from a separate set of the input neural nodes and calculating an output by at least multiplying the input from each input by one of a plurality of input weights; and
- a classifier layer comprising a plurality of neural nodes, each neural node in the classifier layer configured to receive the output from each of the neural nodes of the embedding layer, to generate an output by at least multiplying the output from each neural node of the embedding layer by one of a plurality of input weights, and wherein the output corresponds to a probability that a particular linguistic unit is the focus term;
- wherein the input weights for each neural node of a partition of the embedding layer are trained independently of other partitions.

11. The system of claim 10, wherein the linguistic unit is a character or a word.

12. The system of claim 10, wherein the positions relative to a focus term of the embedding node partitions are window positions relative to the focus term or directions relative to the focus term.

13. The system of claim 10, wherein the plurality of neural nodes, input neural node, embedding layer, and classifier layer form a neural network, the neural network trained by performing functions that comprise:
- training a first partition of the embedding node partitions by:
  - removing the focus term from the ordered list of linguistic units;
  - selecting a partition from each remaining linguistic unit's embeddings based on that respective linguistic unit's position relative to the focus term; and
  - updating weights for each neural node in the classifier layer and embedding layer based on accuracy of the classifier layer in predicting that the particular linguistic unit is the focus term.

14. The system of claim 13, wherein the neural network is trained by performing functions that further comprise:
- training a second partition by:
  - removing the focus term from the ordered list of linguistic units;
  - selecting a partition from each remaining linguistic unit's embedding based on that linguistic unit's position relative to the focus term; and
  - updating the weights based on accuracy of the classifier layer in predicting that the particular linguistic unit is the focus term,
- wherein the steps of training a first partition and training a second partition are performed in parallel.

15. The system of claim 10, wherein particular linguistic units are selected from the ordered list of the plurality of linguistic units and multiple linguistic domains associated with the selected particular linguistic units are modeled into a common vector space, wherein each of the multiple linguistic domains corresponds to a different language.

* * * * *